Dec. 14, 1943.   P. A. HUBER   2,336,867
INDIVIDUAL PRICE-BANDED CARD AND ENVELOPE UNIT
Filed Feb. 24, 1943
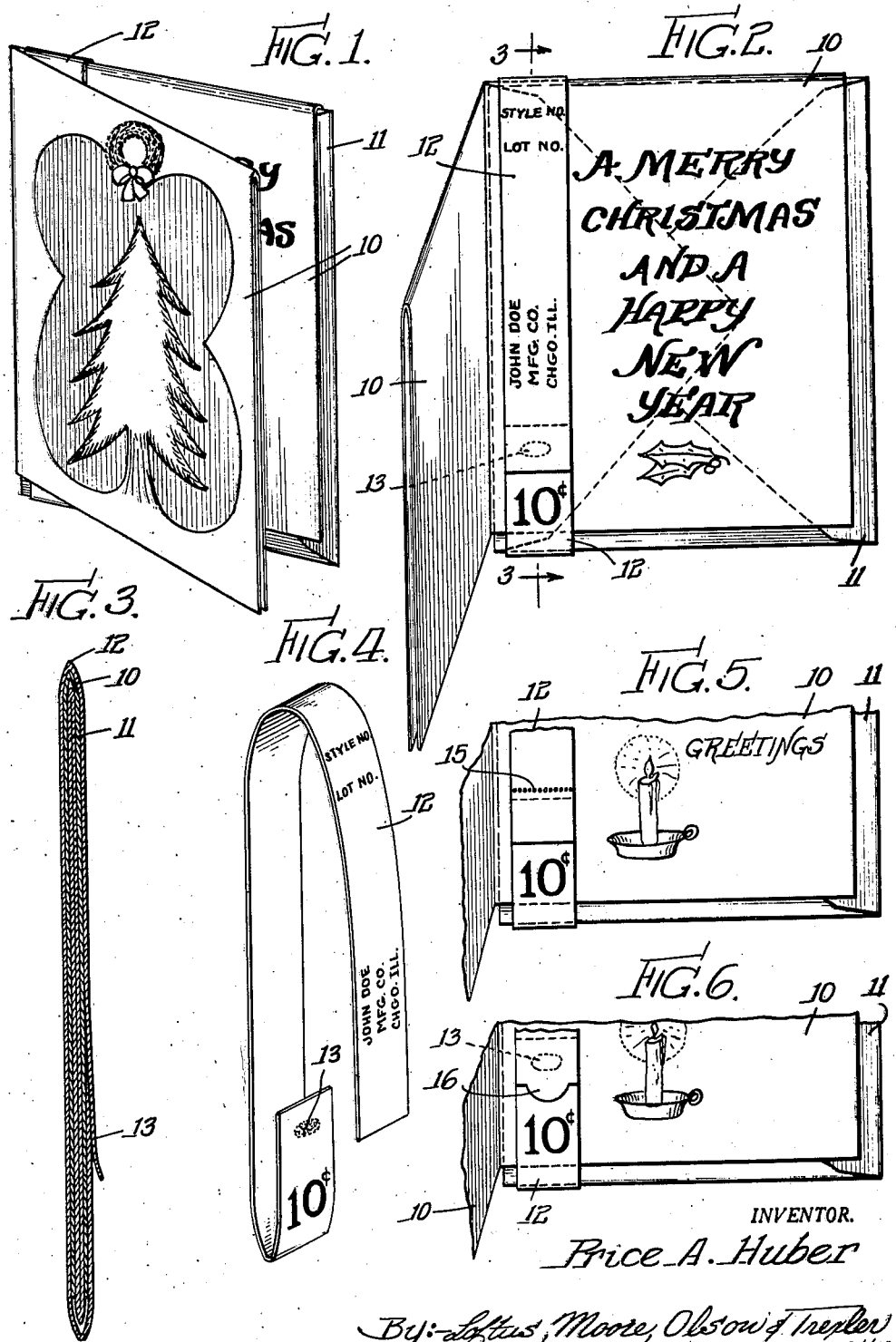
INVENTOR.
Price A. Huber
By: Loftus, Moore, Olson & Trexler
attys.

Patented Dec. 14, 1943

2,336,867

UNITED STATES PATENT OFFICE 2,336,867

INDIVIDUAL PRICE-BANDED CARD AND ENVELOPE UNIT

Price A. Huber, Boston, Mass., assignor, by mesne assignments, to Clarence W. West and Grant Gillam, Chicago, Ill.

Application February 24, 1943, Serial No. 476,928

2 Claims. (Cl. 40—2)

For many decades, there has existed in the trade in the greeting card art a pressing need and demand for an initially and individually price-banded card and envelope unit at the source of production. This long-existing problem has been solved by my present invention.

In the past, such cards and their respective envelopes were stacked at the source, one on another, in a box or container, in which form they reached the retail merchant or store. After being received by the merchant or retail store, it was then necessary to "price-clip"; that is, the envelope was placed in the fold of the card and they were secured together by a paper tab, and the tab in turn held in position by a metal clip. This has been well known for many decades in the greeting card art and trade as "price-clipping." This inherently presented many serious objections which have been long and well recognized in the art.

For example, price-clipping defaces the card, is slow and relatively expensive in comparison with the unit profit derived by the retail store, makes for bulk, and results in delay from the time the cards are received at the retail store until they are put on display.

My present invention completely overcomes all of these objections and disadvantages. Moreover, with my invention, the price-clipping or price-marking department of the stores handling greeting cards is entirely done away with. There are no marks printed, or otherwise, imposed directly upon the card or envelope. With my invention, in its preferred form, the cards and envelopes are inter-leaved and secured together by means of a closed band which holds the component parts together, forming an individual unit, the band carrying the price and, if desired, any and all of the symbols required for merchandising, such as the style number, the lot number, instructions for handling, and the manufacturer's or producer's name, trade-mark or other data, all without defacing the card or envelope and without imprinting or price-marking either the card or envelope, or detracting from the appearance of either in any shape, manner or form.

With my invention, the manufacturer thus initially produces an individual unit consisting of a combination of card and envelope which reaches the dealer or retail store in condition ready to be placed on the sales display rack in the retail store as taken out of the original container. Moreover, the unit is secured together in such a manner that the ultimate purchaser can handle and inspect the card and the artwork, sentiment, or verse on the card without, in any way, disturbing or defacing the merchandise or separating the envelope from the card, and can also, at a glance, see the selling price thereof and the name of the manufacturer.

With my invention, the unit is properly held intact for transporting and maintaining in stacked condition over long periods of time without in any wise defacing the card, and when the ultimate customer desires to convert the initial unit into a separate envelope and card for mailing, all that he need do is remove, by a light pull, the band by which they are secured together.

With my invention, once the unit is initially produced, no further operations of any kind, shape or form or markings need be applied to either the envelope or the card by the dealers or stores offering the card for sale.

My present invention eliminates entirely the danger of defacing the cards such as is present where metal clips are used. Metal clips indent and, under different climatic conditions, produce rust marks on the cards. My invention eliminates entirely the expensive, time-consuming features of the present practice of marking the cards after they have been received before they are placed on sale. It permits a better display of cards on the display racks in the store. It permits the unit of card and envelope to readily slide in and out of the display racks. It eliminates entirely the objectionable feature of one card catching on another such as is true where the price-clips are used.

Further, my invention provides a new and improved method for initially pricing and forming a greeting card unit at the source of manufacture.

In short, my invention possesses to the fullest extent all of the advantages heretofore pointed out, as well as many other inherent advantages, as will become apparent from a detailed description of the accompanying drawing in which I have illustrated a unit embodying a preferred form of my invention, but the unit there shown is to be understood as illustrative only and not as defining the limits of my invention.

In using the word "card" herein, I do not wish to be limited to the particular form of card illustrated, but I use the term "card" to connote any of the forms in use, such as single-sheet, flat cards, folded sheets, French-folded sheets—in short, any unit of substantially flat material adapted to be enclosed in an envelope.

By the term "envelope" as used herein, I do not wish to be limited to the particular type of envelope shown, but rather, I have used the term "envelope" to connote any suitable type envelope, either the flat type, bellows type, or other form or forms.

Referring to the drawing:

Fig. 1 is a perspective view of a unit embodying my invention and may be considered my preferred form. In this form, the enclosure or card is of the French folded type with an envelope of the flap type inter-leaved between the last two leaves.

Fig. 2 is a perspective view of the same unit with the card in a partially opened position and swung away from the opposite pair of folds, displaying the card, the art-work thereon, the means for securing the unit together (which means carries the selling price, the name of the manufacturer, and the lot and style markings).

Fig. 3 is a vertical cross-sectional view taken on the line 3—3 of Fig. 2, looking in the direction indicated by the arrows.

Fig. 4 is a perspective view of the band for securing the package together.

Fig. 5 is a detailed view showing a portion of the unit and band, with perforations in the band.

Fig. 6 is a view, similar to Fig. 5, of a modified form of the band provided with a loose tab at its free end for readily removing the band.

Referring now to the drawing in detail:

The unit, as before stated, is initially and individually formed at the factory, and in the particular illustration shown, consists of a card 10 of the French folded type. Inserted or inter-leaved between two of the leaves of the fold is a suitable envelope 11 in the form shown, of the flap type, and when desired to be used, adapted to receive and accommodate the card in flat, folded condition. Extending around the envelope and the leaves of the card, between which the envelope is inter-leaved, is a price band 12. This band is constructed of very thin, flat material, preferably cellulosic, transparent material. The free ends of the band overlap and are held together by any suitable means or material. The band extends around two leaves of the folded card and the inter-leaved envelope, tightly engaging one edge of the card and one edge of the envelope. Thus the envelope is held from sliding or dropping out of the card, for the moment a slight pull is exerted to separate the card from the envelope longitudinally, the band, being flat, automatically sets up a wedging action and locks, as it were, the envelope and card in place.

In the preferred form shown, one end of the band is provided with a spot of suitable adhesive 13, as best shown in Fig. 4. By pressing the overlapping end of the band against the adhesive spot on the opposed surface of the opposite end of the band, the band is properly sealed and the envelope and card or enclosure held together as a unitary, initially formed unit throughout transporting, handling and displaying, in short until the ultimate customer desires intentionally to utilize the envelope and card, without in any wise defacing or detracting from the appearance of the card or envelope.

The band is, at the point of production, suitably marked by printing, embossing or otherwise, to give the selling price and, if desired, the name of the manufacturer, the lot and style number; for example, as shown in the drawing.

In order that the band may be readily and quickly removed and the package made ready for its ultimate intended use when the ultimate customer so desires, the band in one form, for example as shown in Fig. 5, is provided with suitable perforations as shown at 15 in order that the band may be broken by a slight pull, or, as shown in Fig. 6, the exposed overlapping end of the band may be provided with a loose pull tab 16 which may be grasped by the thumb and finger, and the band separated, by a slight pull.

While the card illustrated in the accompanying drawing is of the French-fold type and is preferably made of paper, it will also be understood that cards of other forms and of other material may be used; for example, metals, metal foil, cloth, leather, synthetic material, or combinations of any of these with paper, and the card may be inserted in the flap of the envelope rather than the envelope inserted in the body of the card, if desired.

It will thus be clear from the foregoing description that I have not only provided a new unit of this character, but a new method of producing such unit, which steps consist of inter-leaving the envelope with the card or the card with the envelope, and then securing the two together by means of a flat, thin, preferably cellulosic band, on which band there is imposed the selling price, and, if desired, the usual symbols required for merchandising, such as the style number, the lot number, and the manufacturer's name.

However, as before stated, I do not wish to be understood to be limited to any specific form or type of envelope or enclosure except as may be called for by the appended claims.

I claim:

1. As an article of manufacture, a unit of the character described, comprising in combination a folded greeting card, a separate flap-type envelope of greater dimension than said card, inter-leaved in said card, and a thin, flat, readily detachable non-elastic price band completely surrounding leaves of said card and inter-leaved envelope and tightly engaging one edge of said envelope and the opposite edge of said card for interlocking the envelope and card together against unintentional separation when transporting, handling and displaying, said price band carrying the selling price.

2. As an article of manufacture, adapted to be initially priced and produced at the source of manufacture, comprising in combination a flap-type envelope, a greeting card of less dimension than said envelope inter-leaved therewith, a thin, flat, non-elastic price band completely surrounding said envelope and card and tightly engaging one edge of said envelope and the opposite edge of said card for retaining said card and envelope as a unit against unintentional separation during transporting, handling, and displaying, said price band carrying the selling price to eliminate price-clipping the card or envelope.

PRICE A. HUBER.